US009304712B2

(12) United States Patent
White (10) Patent No.: US 9,304,712 B2
(45) Date of Patent: Apr. 5, 2016

(54) AUTOMATED WORD SUBSTITUTION FOR CONTEXTUAL LANGUAGE LEARNING

(75) Inventor: Christopher A. White, Neshanic Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 977 days.

(21) Appl. No.: 13/269,763

(22) Filed: Oct. 10, 2011

(65) Prior Publication Data

US 2013/0090914 A1 Apr. 11, 2013

(51) Int. Cl.
| | |
|---|---|
| G06F 17/28 | (2006.01) |
| G06F 3/06 | (2006.01) |
| G09B 19/06 | (2006.01) |
| G09B 17/00 | (2006.01) |

(52) U.S. Cl.
CPC .............. *G06F 3/0688* (2013.01); *G06F 3/065* (2013.01); *G06F 3/0619* (2013.01); *G06F 17/28* (2013.01); *G09B 17/00* (2013.01); *G09B 19/06* (2013.01)

(58) Field of Classification Search
CPC ......... G06F 17/28; G09B 19/06; G09B 17/00
USPC .......................................................... 704/4
See application file for complete search history.

(56) References Cited

U.S. PATENT DOCUMENTS

| | | | | |
|---|---|---|---|---|
| 4,685,060 | A * | 8/1987 | Yamano et al. ..................... 704/4 |
| 5,517,409 | A * | 5/1996 | Ozawa et al. ...................... 704/3 |
| 5,649,826 | A * | 7/1997 | West et al. ..................... 434/157 |
| 7,107,204 | B1 * | 9/2006 | Liu et al. ............................ 704/2 |
| 7,818,164 | B2 * | 10/2010 | Wood et al. ........................ 704/5 |
| 2003/0040899 | A1 * | 2/2003 | Ogilvie ............................... 704/2 |
| 2003/0046057 | A1 * | 3/2003 | Okunishi et al. ................... 704/1 |
| 2004/0138872 | A1 * | 7/2004 | Nir .................................... 704/10 |
| 2005/0149316 | A1 * | 7/2005 | Ushioda et al. .................... 704/2 |
| 2006/0136223 | A1 * | 6/2006 | Brun et al. ...................... 704/277 |
| 2006/0217961 | A1 * | 9/2006 | Masuichi et al. .................. 704/3 |
| 2007/0219775 | A1 * | 9/2007 | Smith ................................. 704/4 |
| 2007/0233461 | A1 * | 10/2007 | Fasciani et al. .................... 704/9 |
| 2007/0281286 | A1 * | 12/2007 | Palacios Orueta ............ 434/185 |
| 2010/0057438 | A1 * | 3/2010 | Zhanyi et al. ..................... 704/4 |
| 2011/0224968 | A1 * | 9/2011 | Sata .................................. 704/2 |
| 2011/0246175 | A1 * | 10/2011 | Yi et al. ............................. 704/3 |
| 2012/0245922 | A1 * | 9/2012 | Kozlova et al. ................... 704/3 |
| 2013/0346063 | A1 * | 12/2013 | Chen et al. ........................ 704/3 |

\* cited by examiner

*Primary Examiner* — Jialong He
(74) *Attorney, Agent, or Firm* — Tong, Rea, Bentley & Kim, LLP (57) ABSTRACT

A contextual language learning capability is disclosed. The contextual language learning capability is configured to enable an end user to use knowledge of a first language to learn a second language. The contextual language learning capability is configured to modify source content (in which content is provided in the first language) to form modified content (including a combination of content in the first language and content in the second language). The source content is processed to replace at least a portion of the content provided in the first language with corresponding content provided in the second language, thereby producing the modified content. The modified content is presented to the end user for use in learning the second language. The replacement of a subset of the source content in the first language with corresponding content in the second language gives context to the content in the second language, thereby giving the end user an understandable context for the content provided in the second language. This increases the likelihood that the end user will be able to understand and, thus, learn, the second language.

21 Claims, 5 Drawing Sheets

EMAIL 411

END USER DISPLAY 410

REPLY   REPLY TO ALL   FORWARD

From: Michael
To: Christopher
Subject: Thank you

Hola Christopher,

I'm writing to say gracias for having us at your casa last weekend. It was wonderful to see you and your familia. I can't believe how much your kids have grown. It's hard to believe that Steve is siete years old and Katy is quatro years old.

Your casa is beautiful. We couldn't believe how much work you have done to it since the last time that we were there. The cosina looks amazing, and the finished sotano is a perfect play room for the kids.

The comida was delicious. Matthew said that it was the best hamburguesa con queso that he has ever eaten.

Our kids had a great time playing at your casa. They especially liked the pool. They are still talking about playing basketball in la piscina, and all of the fun that they had playing with the blue balsa. I hope they didn't splash too much water out of la piscina.

We would like to have you to our casa sometime soon so that los ninos can play together again. We are busy the rest of this month, but perhaps we can plan something for next mes. Well, grasias so much again.

Talk to you pronto.
Michael

FIG. 5

AUTOMATED WORD SUBSTITUTION FOR CONTEXTUAL LANGUAGE LEARNING

TECHNICAL FIELD

The invention relates generally to language learning and, more specifically but not exclusively, to contextual language learning.

BACKGROUND

There is significant demand for products and services that assist people in learning languages.

SUMMARY

Various deficiencies in the prior art are addressed by embodiments for contextual language learning.

In one embodiment, an apparatus includes a processor and a memory, where the processor is configured to process, based on content replacement control information, source content in a first language to replace a subset of the source content in the first language with corresponding content in a second language.

In one embodiment, a computer readable storage medium stores instructions which, when executed by a computer, cause the computer to perform a method which includes processing, based on content replacement control information, source content in a first language to replace a subset of the source content in the first language with corresponding content in a second language.

In one embodiment, a method includes processing, based on content replacement control information, source content in a first language to replace a subset of the source content in the first language with corresponding content in a second language.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

In general, a contextual language learning capability is depicted and described herein, although various other capabilities also may be presented herein.

In at least some embodiments, the contextual language learning capability is configured to enable an end user to use knowledge of a first language to learn a second language.

In at least some embodiments, the contextual language learning capability is configured to modify source content in a first language (e.g., in which words are provided in the first language) to form modified content including a combination of content in the first language and content in the second language (e.g., including a combination of words in the first language and words in the second language). The source content is processed to replace at least a portion of the content provided in the first language with corresponding content provided in the second language, thereby producing the modified content. The modified content is presented to the end user for use in learning the second language.

In at least some embodiments, the contextual language learning capability, by replacing a subset of the words provided in the first language with corresponding words provided in the second language, gives context to the words provided in the second language. This gives the end user an understandable context for the words provided in the second language and, thus, increases the likelihood that the end user will be able to understand and, thus, learn, the second language.

In at least some embodiments, the contextual language learning capability, by replacing a subset of the words provided in the first language with corresponding words provided in the second language within the context of an activity normally performed by the end user (e.g., reading an email, viewing content received from the Internet, reading an electronic book, listening to an audio book, and the like), ensures that the process of language learning is not necessarily solely focused on language learning. This enables language learning to be performed as a secondary activity in conjunction with the primary activity that would otherwise be performed by the end user anyway. This increases the likelihood that the end user will practice language learning, because the language learning is achieved while the end user is performing activities that he or she would be performing anyway, and, further, because the need for the end user to set aside additional time to devote only to language learning is obviated.

Figure 1:
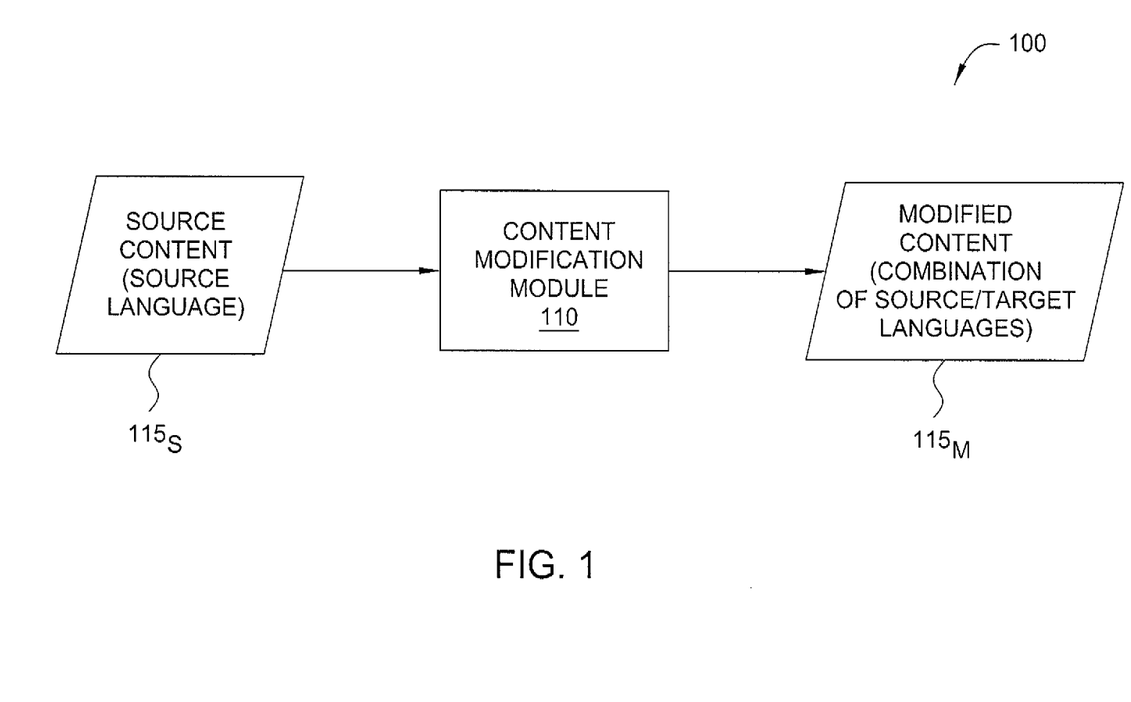
FIG. 1 depicts one embodiment of a contextual language learning capability.

FIG. 1 depicts one embodiment of a contextual language learning capability.

The contextual language learning capability 100 enables an end user to use his or her knowledge of a first language (also referred to herein as a source language) to learn a second language (also referred to herein as a target language).

The contextual language learning capability 100 is configured to use a content modification module 110 to process source content $115_S$ (which includes content in the source language) to form thereby modified content $115_M$ (which includes a combination of content in the source language and content in the target language). The content modification module 110 receives the source content $115_S$. The content modification module 110 processes the source content to replace at least a portion of the content provided in the source language with corresponding content provided in the target language. The content modification module 110 outputs the modified content $115_M$. The modified content $115_M$ is presented to the end user for use by the end user in learning the target language. It is noted that references herein to content (e.g., content provided in the source language and content provided in the target language) also may be read as being references to words, as one or more words of the source content may be replaced with one or more words of the target content at any suitable granularity (e.g., for words, phrases, sentences, paragraphs, and the like). In this manner, the replacement of a subset of the words provided in the source language with corresponding words provided in the target language (such that modified content $115_M$ includes a combination of words in the source language and words in the target language) gives context to the words provided in the target language, thereby enabling the end user to experience the words of the target language within the context of the modified content $115_M$ that still includes words in the source language. This gives the end user an understandable context for the words provided in the target language, thereby increasing the likelihood that the end user will be able to understand and, thus, learn the target language.

The content modification module 110 is configured to process source content $115_S$ to form modified content $115_M$ within the context of an activity normally performed by the end user. For example, the activity may include one or more of viewing content available locally on an end user device, viewing content received via a network connection, and the like. For example, the activity may include one or more of reading a document, reading email, reading an electronic book, listening to an audio book, and the like. As noted herein, this ensures that the process of language learning is not necessarily solely focused on language learning. In this manner, the activity for which content modification is performed may be considered to be a primary activity of the end user and language learning that is provided as a result of content modification may be considered to be a secondary activity of the end user that is performed in conjunction with the primary activity that would otherwise be performed by the end user anyway.

The content modification module 110 may be configured to support context-based language learning for any suitable languages. The source language may be any language suitable for use as a reference language that will facilitate learning of the target language by the end user (e.g., any language of which the end user has a relatively good understanding, such as a native language of the end user or any other language suitable for use as a reference language that will facilitate learning of the target language by the end user). The target language may be any language which the end user is attempting to learn (e.g., where the end user is attempting to attain a basic understanding of the language, where the end user has at least some level of proficiency/competency in the language and is attempting to improve one or more aspects of his or her proficiency in the language, and the like). For example, the source language and the target language may be selected from any suitable set of languages, such as English, French, German, Japanese, Russian, Mandarin, and/or any other languages.

The content modification module 110 may be configured to support content replacement processing for any suitable type of source content $115_S$ and modified content $115_M$. For example, source content $115_S$ may be text-based content (e.g., a document, an email, a webpage, and the like), audio-based content (e.g., a song, an audio clip, an audio book, and the like), video-based content, multimedia content, or any other suitable type of content. Similarly, for example, modified content $115_M$ may be text-based content (e.g., a document, an email, a webpage, and the like), audio-based content (e.g., a song, an audio clip, an audio book, and the like), video-based content, multimedia content, or any other suitable type of content or any other suitable type of content. As such, various embodiments of contextual language learning capability 100 enable learning of written and/or auditory aspects of the target language.

The content modification module 110 may be configured to utilize source content $115_S$ from any suitable source(s). For example, source content $115_S$ may be sourced from local memory of a device processing the source content $115_S$ to form modified content $115_M$, a local content storage medium (e.g., disk, flash drive, and the like) local to a device processing the source content $115_S$ to form modified content $115_M$, an information stream being received by a device processing the source content $115_S$ to form modified content $115_M$ (e.g., data stream, audio stream, and the like), and the like.

In one embodiment, source content $115_S$ and modified content $115_M$ may be of the same content type (e.g., where text-based source content $115_S$ is modified to produce text-based modified content $115_M$, where audio-based source content $115_S$ is modified to produce audio-based modified content $115_M$, and the like).

In one embodiment, source content $115_S$ and modified content $115_M$ may be of different content types. In one embodiment, for example, where text-based source content $115_S$ is modified by content modification module 110 to form text-based modified content $115_M$, the text-based modified content $115_M$ may then be converted from text to audio for presentation to the end user in audio format (e.g., using a text-to-audio conversion mechanism).

In one embodiment, for example, where audio-based source content $115_S$ is modified by content modification module 110 to form audio-based modified content $115_M$, the audio-based modified content $115_M$ may then be converted from audio to text for presentation to the end user in text format (e.g., using an audio-to-text conversion mechanism). It is noted that other types of content conversions may be used. It is further noted that although primarily described with respect to embodiments in which content conversion is performed after the source content $115_S$ is processed to form the modified content $115_M$, content conversion may be performed prior to processing of the source content $115_S$ to form the modified content $115_M$.

The content modification module 110 may be configured to activate and deactivate contextual language learning in any suitable manner. In one embodiment, for example, contextual language learning may be activated or deactivated manually by an end user. In one embodiment, for example, contextual language learning may be activated automatically (e.g., in response to invocation of a program, in response to detection that a particular type of content is received or requested, and the like, or in response to any other suitable condition or trigger). The use of contextual language learning may be manually or automatically activated/deactivated in various contexts, e.g., contextual language learning may be activated/deactivated on a per content item basis (e.g., for some or all of the content items within one or more programs via which contextual learning may be provided), on a per program basis (e.g., for all emails opened via an email reader for which contextual language learning is provided, for all web pages accessed via a browser for which contextual language learning is provided, and the like), for some or all of the programs used by the end user, on a per information stream basis (e.g., for some or all of the information streams accessed by the end user), and the like, as well as combinations thereof.

The content modification module 110 may be configured to control at least one characteristic of the subset of the words in the first language that are replaced with corresponding words in the second language. For example, the least one characteristic may include a percentage of content replaced, a scope of content replaced (e.g., words only, sentences only, words and sentences, and the like), a type of content replaced (e.g., nouns only, pronouns only, verbs only, nouns and verbs, and the like), a vocabulary difficulty of content replaced, and the like, as well as various combinations thereof.

The content modification module 110 may be configured to control modification of source content $115_S$ to form modified content $115_M$ in any suitable manner. It is noted that control of modification of source content $115_S$ to form modified content $115_M$ may include control over selection of the portion(s) of source content $115_S$ in the first language to be replaced with content in the second language to form thereby the modified content $115_M$ (i.e., processing of the source content $115_S$ to form modified content $115_M$ may include selection of the subset of source content $115_S$ in the first language that is to be replaced with corresponding content in the second language).

In one embodiment, for example, at least a portion of source content $115_S$ which is modified to form modified content $115_M$ may be selected based on content replacement control information. In one embodiment, for example, content replacement control information may include one of more of: one or more content replacement parameters, indications of user proficiency with respect to the target language, user feedback information (e.g., offline and/or real time), language-specific control information, dynamic analysis, and the like, as well as various combinations thereof.

In one embodiment, for example, at least a portion of source content $115_S$ which is modified to form modified content $115_M$ may be selected according to one or more content replacement parameters. The content replacement parameter(s) may be configured to control various aspects of content replacement, such as one or more of the percentage of content replaced (e.g., 5%, 20%, and the like), the scope of content replaced (e.g., words, phrases, sentences, paragraphs, and the like), the type of content replaced, the difficulty of the vocabulary of content replaced, and the like, as well as various combinations thereof.

In one embodiment, for example, a content replacement percentage parameter is configured to control the percentage of content of the source language that is replaced by corresponding content of the target language. For example, the content replacement percentage may specify a percentage of words to be replaced. For example, the content replacement percentage may specify a percentage of sentences to be replaced (e.g., where content replacement is performed at the sentence level). It is noted that the content replacement percentage parameter may support any suitable number and/or types of values. For example, the content replacement percentage parameter may be configurable in 5% increments, 10% increments, or at any other suitable granularity, although any other suitable types and/or numbers of values may be used.

In one embodiment, for example, a content replacement scope parameter is configured to control the scope of content of the source language that is replaced by corresponding content of the target language. For example, the content replacement scope parameter may be configured to specify replacement of individual words, phrases, sentences, paragraphs, a mix of one or more scopes, and the like. It is noted that the content replacement scope parameter may support any suitable number and/or types of values. For example, the content replacement percentage parameter may be set to values of "words", "phrases", "sentences", "paragraphs", and the like, although any other suitable types and/or numbers of values may be used.

In one embodiment, for example, a content replacement type parameter is configured to control the type of content of the source language that is replaced by corresponding content of the target language. For example, where the content replacement scope parameter is set to "words", the content replacement type parameter may be configured to specify replacement of only nouns, only verbs, only subjects, nouns and verbs, subjects and nouns, verbs and adjectives, and the like. For example, where the content replacement scope parameter is set to "sentences", the content replacement type parameter may be configured to specify replacement of sentences other than the first sentence of any paragraph. It is noted that the content replacement type parameter may support any suitable number and/or types of values. For example, the content replacement type parameter may be set to values of "nouns", "verbs", "nouns/verbs", "verbs/adjectives", and the like, although any other suitable types and/or numbers of values may be used.

In one embodiment, for example, a vocabulary difficulty parameter is configured to control the difficulty level of words/phrases the source language that are replaced by corresponding words/phrases of the target language. It is noted that the value specified for the vocabulary difficulty parameter may be indicative of the highest difficulty of words for which replacement is performed (e.g., selection of a "medium" level results in replacement of words classified as "easy" and/or "medium"). It is noted that the vocabulary difficulty parameter may support any suitable number and/or types of values. For example, the vocabulary difficulty parameter may be set to values of "easy", "medium", "difficult", and the like, although any other suitable types and/or numbers of values may be used.

Although primarily depicted and described with respect to use of specific content replacement parameters to control content replacement, it is noted that various other content replacement parameters may be used to control content replacement (e.g., fewer parameters, more parameters, different sets of parameters, parameters defined in other ways, and the like).

Although primarily depicted and described with respect to use of specific numbers and types of values of the content replacement parameters to control replacement, it is noted that various other numbers and/or types of values of the content replacement parameters may be used to control content replacement.

The content replacement parameters may be determined in any suitable manner. For example, content replacement parameters may be specified within one or more programs executed to provide functions of the contextual language learning capability, retrieved from memory, determined based on user input (e.g., values set in advance, values set and/or changed on the fly, and the like), determined from a user profile of the associated end user (e.g., stored locally on an end user device processing the source content $115_S$ to form modified content $115_M$, hosted on a network device for use by the network device where the network device is processing the source content $115_S$ to form modified content $115_M$ and/or for use by an end user device where the end user device is processing the source content $115_S$ to form modified content $115_M$, and the like), and the like, as well as various combinations thereof.

The content replacement parameters may be adjusted in any suitable manner. For example, content replacement parameters may be adjusted manually (e.g., in response to end user input, such as specific requests to modify values of parameters, feedback regarding the language learning of the end user, and the like). For example, one or more of the content replacement parameters may be adjusted automatically in response to one or more triggers or conditions (e.g., based on the type of activity that is being performed by the end user, in response to an indication of a certain level of and/or change in proficiency of an end user with respect to the target language, and the like).

In one embodiment, one or more of the content replacement parameters may be directly controllable by the end user. For example, an end user may specify one or more of a value of the content replacement percentage parameter, a value of the content replacement scope parameter, a value of the content replacement type parameter, a value of the vocabulary difficulty parameter, and the like.

In one embodiment, one or more of the content replacement parameters may be indirectly controllable by the end user using one or more user-controllable parameters. In one such embodiment, setting of the value(s) for the user-controllable parameter(s) may result in setting of appropriate values of the underlying content replacement parameters which are used to control content replacement. It is noted that the user-controllable parameter(s) may support any suitable number(s) and/or type(s) of values which may be specified by the end user.

In one embodiment, for example, a user-controllable difficulty level parameter may be supported, whereby the end user may specify a difficulty level for use of the contextual language learning capability which results in setting of appropriate values of one or more of the content replacement parameters. The user-controllable difficulty level parameter may support any suitable numbers and/or types of values.

For example, levels of "easy", "medium", "difficult", and "expert" may be supported. In this case, for example, selection of "easy" may result in setting of the content replacement parameters as follows: the content replacement percentage parameter is set to 10%, the content replacement scope parameter is set to "words", the content replacement type parameter is set to "nouns/subjects", and the vocabulary difficulty parameter is set to "easy". In this case, for example, selection of "difficult" may result in setting of the content replacement parameters as follows: the content replacement percentage parameter is set to 50%, the content replacement scope parameter is set to "words/sentences", the content replacement type parameter is set to "nouns/subjects/verbs", and the vocabulary difficulty parameter is set to "medium".

For example, ten levels numbered one (easiest) through ten (most difficult) may be supported. In this case, for example, selection of level "three" may result in setting of the content replacement parameters as follows: the content replacement percentage parameter is set to 15%, the content replacement scope parameter is set to "words/phrases", the content replacement type parameter is set to "nouns//verbs/subjects", and the vocabulary difficulty parameter is set to "medium". In this case, for example, selection of level "eight" may result in setting of the content replacement parameters as follows: the content replacement percentage parameter is set to 60%, the content replacement scope parameter is set to "sentences", the content replacement type parameter is set to "all" (given that replacement is performed at the sentence level), and the vocabulary difficulty parameter is set to "difficult".

It is noted that the user-controllable difficulty level parameter may be specified using any other suitable number and/or type of values.

It is further noted that the user-controllable difficulty level parameter is merely one example of a type of user-controllable parameter which may be employed for providing the end-user with control over various aspects of the contextual language learning capability.

Although primarily depicted and described with respect to use of a single user-controllable parameter to control all of the content replacement parameters, it is noted that one or more user-controllable parameters may be used to control one or more of the content replacement parameters.

In one embodiment, for example, at least a portion of source content $115_S$ which is modified to form modified content $115_M$ may be selected randomly. For example, where a content replacement percentage specifies a certain percentage of the source content $115_S$ which is to be replaced, the words of the source content $115_S$ may be selected randomly (e.g., rather than based on one or more other content replacement parameters such as the scope of content replaced, the type of content replaced, the difficulty of the vocabulary of content replaced, and the like.

The content modification module 110 may be configured to perform content replacement, in order to replace a portion of the content provided in the source language with corresponding content of the target language, in any suitable manner. For example, content modification module 110 may be configured to use one or more language translation lists (e.g., lists of words and/or phrases in two or more languages for enabling translation between the two or more languages) for translating portions of the source content $115_S$ from the source language to the target language. For example, content modification module 110 may be configured to process the source content $115_S$ using a machine-based language translation tool for translating portions of the source content $115_S$ from the source language to the target language. The modification of portions of source content $115_S$ from the source language to the target language to form modified content $115_M$ may be performed using any other suitable language translation tools and/or capabilities.

The content modification module 110 may be configured to adjust content replacement, for replacing a portion of the content provided in the source language with corresponding content of the target language, in any suitable manner. In one embodiment, for example, one or more aspects of replacement of content in the source language with corresponding content in the target language may be adjusted according to at least one input (e.g., in response to an indication of a proficiency of an end user with respect to the target language, in response to an indication of an input entered by an end user, and the like). For example, parameters such as the percentage of words replaced, the difficulty of the vocabulary of the words replaced, and the like may be adjusted based on such input information. In this manner, the overall difficulty of the language learning process may be smoothly adjusted according to the level of proficiency and/or desires of the language learner.

The content modification module 110 may be configured to support handling of the modified content $115_M$ in any suitable manner. For example, the modified content $115_M$ may be stored (e.g., locally at a device at which the modified content modified content $115_M$ is formed and/or remotely at one or more devices remote from the device at which the modified content modified content $115_M$ is formed), presented to one or more users (e.g., via one or more display devices in the case of text-based content, via one or more speakers in the case of audio-based content, and the like), transmitted to one or more devices (e.g., for one or more of storage, presentation, and the like), and the like, as well as various combinations thereof.

Although primarily depicted and described herein with respect to embodiments in which certain features of the contextual language learning capability 100 are independent of the source and the target languages (e.g., the percentage of content replaced, the type of content replaced, and the like), it is noted that, in one or more embodiments, one or more features of the contextual language learning capability 100 may be dependent on the source language and/or the target language.

The content modification module 110 may be configured to configure one or more characteristics of contextual language learning on a per-language basis (e.g., based on the source language and/or based on the target language for which the contextual language learning capability 100 is employed) and/or on a per-language pair basis (e.g., based on the specific combination of source language/target language for which the contextual language learning capability 100 is employed). It is noted that such configuration may be performed in advance and/or on-the-fly.

In one embodiment, for a given language, one or more characteristics of the contextual language learning may be configured based on one or more language characteristics of the underlying language.

In one embodiment, for a given source language, one or more characteristics of contextual language learning may be configured based on knowledge regarding the manner in which the source language is or may be used as a source language for teaching/learning another language. It is noted that the manner in which one language is typically used as a basis for language teaching/learning may be different than the manner in which another language is typically used as a basis for language teaching/learning. This may be due to various factors, such as one or more characteristics of the languages, existing knowledge regarding the optimum ways to teach/learn the languages, and the like, as well as various combinations thereof. For example, the type(s)/set(s) of core words first targeted for teaching/learning in a first language may be different than the type(s)/set(s) of core words first targeted for teaching/learning in a second language. Similarly, for example, type(s)/set(s) of secondary words targeted for teaching/learning in a first language (which build upon the core words first taught/learned in the first language) may be different than the type(s)/set(s) of secondary words targeted for teaching/learning in a second language (which, again, build upon the core words first taught/learned in the first language). It is noted that various other aspects of language teaching/learning may be different for different languages.

In one embodiment, for a given target language, one or more characteristics of contextual language learning may be configured based on knowledge regarding the manner in which the target language is or may be taught/learned. It is noted that the manner in which one language is typically taught/learned may be different than the manner in which another language is typically taught/learned. This may be due to various factors, such as one or more characteristics of the languages, existing knowledge regarding the optimum ways to teach/learn the languages, and the like, as well as various combinations thereof. For example, the type(s)/set(s) of core words first taught/learned in a first language may be different than the type(s)/set(s) of core words first taught/learned in a second language. Similarly, for example, type(s)/set(s) of secondary words in a first language (which build upon the core words first taught/learned in the first language) may be different than the type(s)/set(s) of secondary words first taught/learned in a second language (which, again, build upon the core words first taught/learned in the first language). It is noted that various other aspects of language teaching/learning may be different for different languages.

In such embodiments, it is noted these differences between languages and/or language pairs may be evident from existing sources of knowledge regarding language teaching/learning, such as language teaching/learning textbooks, existing language teaching/learning programs, existing language teaching/learning research, and the like. In at least some such embodiments, this knowledge regarding language teaching/learning may be leveraged to configure various aspects of contextual language learning provided by the content modification module 110.

In one embodiment, for example, configuration of one or more characteristics of contextual language learning for different languages and/or language pairs may include use of different parameters and/or different parameters values of the content replacement parameters for different languages and/or language pairs.

In one embodiment, for example, configuration of one or more characteristics of contextual language learning for different languages and/or language pairs may include use of different content translation mechanisms (e.g., use of different source content types, use of different translation techniques (e.g., word translation lists versus machine-based language translation tools), and the like, as well as various combinations thereof) for different languages and/or language pairs.

It is noted that various other characteristics of contextual language learning may be controlled for different languages and/or language pairs on the basis of various other types of language characteristics, various other types of language teaching/learning knowledge, other types of information, and the like, as well as various combinations thereof.

It is noted that, where characteristics of contextual language learning are controlled for different languages and/or language pairs on the basis of such information (e.g., language characteristics, language teaching/learning knowledge, other types of information, and the like), this information used to control characteristics of contextual language learning also may be referred to herein as language-specific control information.

As described herein, contextual language learning capability 100 is configured to use a content modification module 110 to process source content $115_S$ to form thereby modified content $115_M$. Accordingly, it will be appreciated that various functions attributed herein to contextual language learning capability 100 may be provided by content modification module 110 and, similarly, that the content modification module 110 may be implemented in any manner suitable for providing such functions. For example, the content modification module 110 may be provided using hardware or a combination of hardware and software. For example, content modification module 110 may include a processor and a memory, where the memory stores instructions which, when executed by the processor, cause the processor to perform such functions of the contextual language learning capability 100. For example, content modification module 110 may represent a software program(s) which may be stored in memory and which, when executed by a processor(s), cause the processor to perform such functions of contextual language learning capability 100. For example, the content modification module 110 may represent hardware, alone or in combination with associated software, configured to perform such functions of contextual language learning capability 100. The implementation of content modification module 110 may be better understood by way of reference to FIG. 2 and FIG. 5.

As described herein, the contextual language learning capability 100 may be supported within various types of environments.

Figure 2:
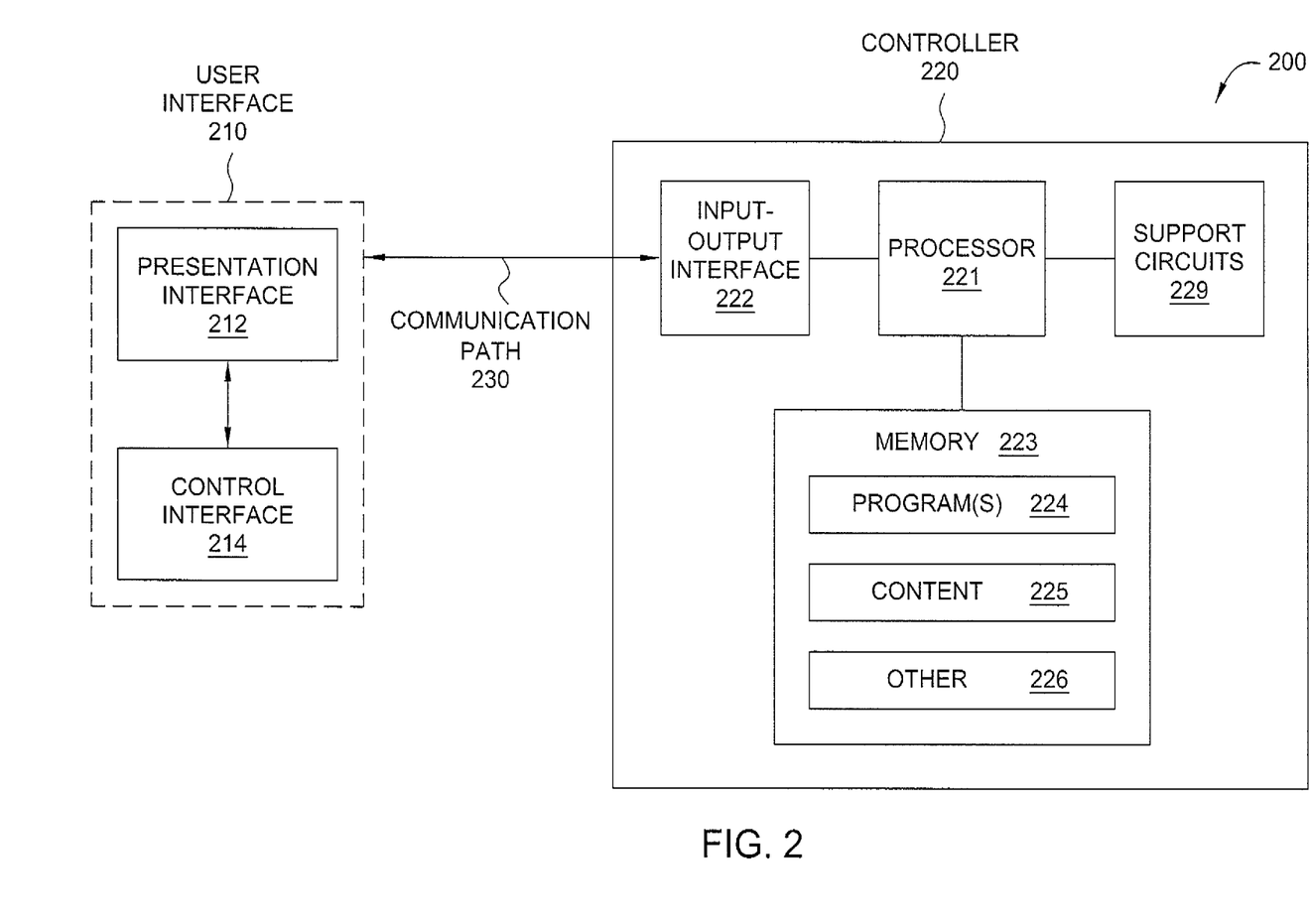
FIG. 2 depicts one embodiment of an environment configured to support a contextual language learning capability.

FIG. 2 depicts one embodiment of an environment configured to support a contextual language learning capability.

As depicted in FIG. 2, environment 200 includes a user interface 210 and a controller 220 in communication via a communication path 230.

The user interface 210 includes a presentation interface 212 and a control interface 214.

The presentation interface 212 is configured to present content, such as one or more of text-based content, audio-based content, video-based content, multimedia content, and the like, as well as various combinations thereof. The presentation interface 212 is configured to present modified content generated via content replacement performed using the contextual language learning. The presentation interface 212 also may be configured to present other types of content.

The control interface 214 is configured to accept user input of an end user. The control interface 214 is configured to accept user input in various formats (e.g., via a keyboard, via point-and-click operations using a mouse, via a keypad, via buttons, via a microphone, and the like). The control interface 214 is configured to accept various types of user input within the context of contextual language learning. For example, the user input may include user input via which the user may request activation of the contextual language learning capability, configure various aspects of the contextual language learning capability, interact with the contextual language learning capability (e.g., selecting a difficulty level to be used, selecting content presented in a target language for accessing the corresponding content in the source language, and the like), request deactivation of the contextual language learning capability, and the like, as well as various combinations thereof.

The controller 220 includes a processor 221, an input-output interface 222, a memory 223, and support circuits 229.

The processor 221 is configured to communicate with each of the input-output interface 222, the memory 223, and the support circuits 229. Although omitted for purposes of clarity, it is noted that any component of controller 120 may be configured to communicate or interact with any other component of controller 220.

The input-output interface 222 is configured to provide a bidirectional interface between controller 220 and user interface 210, such that controller 220 and user interface 210 may exchange information via the communication path 230.

The memory 223 stores program(s) 224, content 225, and, optionally, other information 226 which may be stored in conjunction with providing various embodiments of contextual language learning.

The support circuits 229 may include any support circuits which may included within controller 220 (e.g., power supplies, communication buses, and the like).

The processor 221 is configured to provide various functions of contextual language learning. For example, the processor 221 may retrieve and execute program(s) 224 of memory 223 for providing various functions of the contextual language learning capability. For example, where content 225 includes source content $115_S$ to be modified in accordance with the contextual language learning capability, the processor 221 may retrieve source content $115_S$ from memory 223 and process the source content $115_S$ to form thereby modified content $115_M$ which may be handled in any suitable manner (e.g., stored within memory 223, propagated toward user interface 210 via communication path 230 for presentation via user interface 210, and/or handled in any other suitable manner). For example, where content 225 includes modified content $115_M$ formed in accordance with the contextual language learning capability, the processor 221 may retrieve the modified content $115_M$ from memory 223 for propagation toward user interface 210 via communication path 230 such that the modified content $115_M$ may be presented via user interface 210. The processor 221 may be configured to provide various other functions of the contextual language learning capability.

As described herein with respect to FIG. 1, the content modification module 110 of FIG. 1 may be implemented in any suitable manner. Within the context of FIG. 2, for example, the content modification module 110 may correspond to controller 220 or a portion(s) of controller 220. For example, content modification module 110 may correspond to processor 221. For example, content modification module 110 may correspond to processor 221 and memory 223. For example, content modification module 110 may correspond to program(s) 224, which may be executed within the context of controller 220. As noted herein, the content modification module 110 of FIG. 1 may be implemented within exemplary environment 200 of FIG. 2 in any other suitable manner.

As described herein with respect to FIG. 1 and FIG. 2, embodiments of contextual language learning capability 100 may be provided in many different types of environments. Accordingly, the environment 200 of FIG. 2 may be considered to represent a number of specific environments within which embodiments of the contextual language learning capability 100 may be provided.

In one embodiment, for example, environment 200 is an end user computer (e.g., desktop, laptop, tablet, smartphone, and the like). For example, the end user computer may be a desktop computer, in which case, for example, presentation interface 212 may include one or more presentation-based peripheral devices (e.g., a monitor or other display device, speakers, and the like), control interface 214 may include one or more user interface peripheral devices (e.g., a keyboard, a mouse, a microphone, and the like), controller 220 may be the computer tower (e.g., the CPU, memory, and other associated processing capabilities of the desktop computer), and communication path 230 may represent one or more wired and/or wireless interfaces between the computer tower and the presentation interface 212 and the control interface 214. For example, the end user computer may be a laptop computer, in which case, for example, presentation interface 212 may include one or more presentation interfaces (e.g., a laptop screen, speakers, and the like), control interface 214 may include one or more user interfaces (e.g., a keyboard, a track pad, a microphone, and the like), controller 220 may be the internal processing capabilities (e.g., the CPU, memory, and other associated hardware and software of the desktop computer) of the laptop, and communication path 230 may represent one or more internal interfaces between the internal processing capabilities represented by controller 220 and the interfaces represented by user interface 210. The configuration of environment 200 as other types of end user devices (e.g., tablet computers, smartphones, and the like) will be understood at least in view of the examples provided above. It is noted that, in at least some such embodiments, the program(s) 224 configured to provide embodiments of the contextual language learning capability may be pre-installed on the end user device, installed on the end user device locally (e.g., via an installation disk or other device, product, or medium including the programs), received from a remote source which is omitted for purposes of clarity (e.g., downloaded from a network device), and the like. Similarly, it is noted that in at least some such embodiments, the source content $115_S$ which is modified in accordance with embodiments of the contextual language learning capability may be pre-installed on the end user device, installed on the end user device locally, received from a remote source which is omitted for purposes of clarity (e.g., an email received over a communication network, content requested from the network and delivered to the end user device (e.g., an e-book, a webpage, and the like)), and the like.

In one embodiment, for example, environment 200 is a system where user interface 210 forms part of an end user device and controller 220 forms part of a network device, and where communication path 230 is a network communication path. In this embodiment, the end user device may be any end user device suitable for use in receiving and presenting content modified by the network device in accordance with embodiments of the contextual language learning capability.

For example, the end user device may be a desktop computer, laptop computer, tablet computer, smartphone, or any other suitable end user device. It is noted that, in this context, various elements of the end user device are omitted (e.g., processors, memory, and like components of the end user device). In this embodiment, the network device may be any network device suitable for use in modifying source content in accordance with embodiments of the contextual language learning capability to form thereby modified content to be propagated to the end user device. For example, the network device may be an email server, a web server, a content server, a database, or any other suitable device. In this embodiment, the network communication path may be any suitable type of network communication path which may be supported using any suitable type of underlying communication network. It is noted that, in at least some such embodiments, the source content $115_S$ which is modified by the network device in accordance with embodiments of the contextual language learning capability may be stored on the network device or in a storage device associated with the network device, received from a remote source (e.g., from one or more other network devices, from one or more other end user devices, and the like), and the like. Similarly, it is noted that, in at least some such embodiments, the modified content $115_M$ which is formed by the network device in accordance with embodiments of the contextual language learning capability may be stored on the network device or in a storage device associated with the network device, propagated toward the end user device, and the like.

Although primarily depicted and described with respect to providing embodiments of the contextual language learning capability 100 within specific types of environments, it is noted that various embodiments of the contextual language learning capability 100 may be provided in any other suitable type(s) of environment(s).

Figure 3:
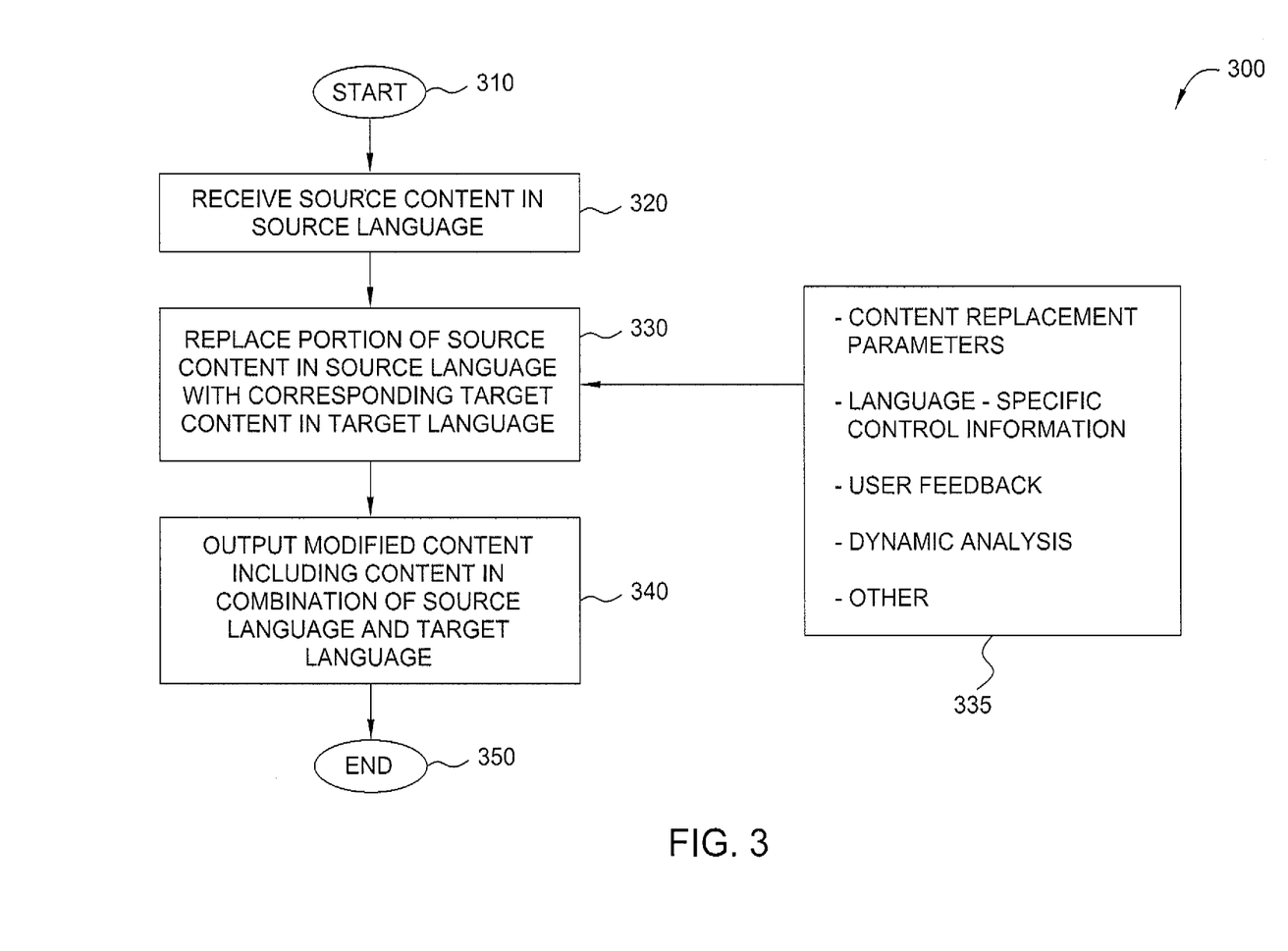
FIG. 3 depicts one embodiment of a method for providing contextual language learning.

FIG. 3 depicts one embodiment of a method for providing contextual language learning. Although the steps of method 300 are primarily depicted and described as being performed serially, it is noted that the steps of method 300 may be performed contemporaneously and/or in a different order than presented in FIG. 3.

At step 310, method 300 begins.

At step 320, source content is received. The source content includes content in a source language. The source content may be received at any suitable device or element from any suitable device or element (e.g., at a processor of an end user device from a memory of the end user device, at an end user device from a network device, and the like). The manner in which source content is received may be better understood by way of reference to FIG. 1 and FIG. 2.

At step 330, the source content is processed to replace a portion of the content in the source language with corresponding content in the target language. As depicted in FIG. 3, replacement of portions of content in the source language with corresponding content in the target language may be performed based on various types of content replacement control information (indicated by box 335 that is illustrated as input to step 330). For example, content replacement control information may include one of more of: one or more content replacement parameters, indications of user proficiency with respect to the target language, user feedback information (e.g., offline and/or real time), language-specific control information, dynamic analysis, and the like, as well as various combinations thereof. The use of such content replacement control information for processing the source content to generate the modified content is described in additional detail with respect to FIG. 1. It is noted that processing of source content to replace a portion of the source content in the source language with corresponding content in the target language may include selection of the subset of words of the source content to be replaced with corresponding words in the target language, where selection may be performed using such content replacement control information.

At step 340, modified content is output. The modified content includes content in a combination of the source language and the target language. The outputting of the modified content may refer to outputting of the modified content from the module which produces the modified content. The outputting of the modified content also may refer to the various ways in which modified content may be handled. For example, outputting of the modified content may refer to propagation of the modified content to a local memory for storage, propagation of the content to a remote memory for storage, propagation of the content to a presentation interface for presentation to an end user, and the like, as well as various combinations thereof. The manner in which modified content is output may be better understood by way of reference to FIG. 1 and FIG. 2. Furthermore, the manner in which modified content may be presented and used may be better understood with respect to FIG. 4.

At step 350, method 300 ends. Although depicted and described as ending for purposes of clarity, it is noted that method 300 may continue to be repeated in at least some embodiments and/or additional steps may be performed after completion of method 300 in at least some embodiments. In one embodiment, for example, in which the source content is received as a content stream, the steps of method 300 may continue to be repeated as each portion of the streaming source content is received and processed to produce the modified content. In one embodiment, for example, where the modified source content is presented to one or more end users, additional steps associated with presentation of the content, and processing associated interactions by the end user with the presented content, may be performed. It is noted that various other modifications to and/or extensions of method 300 may be supported.

Figure 4:
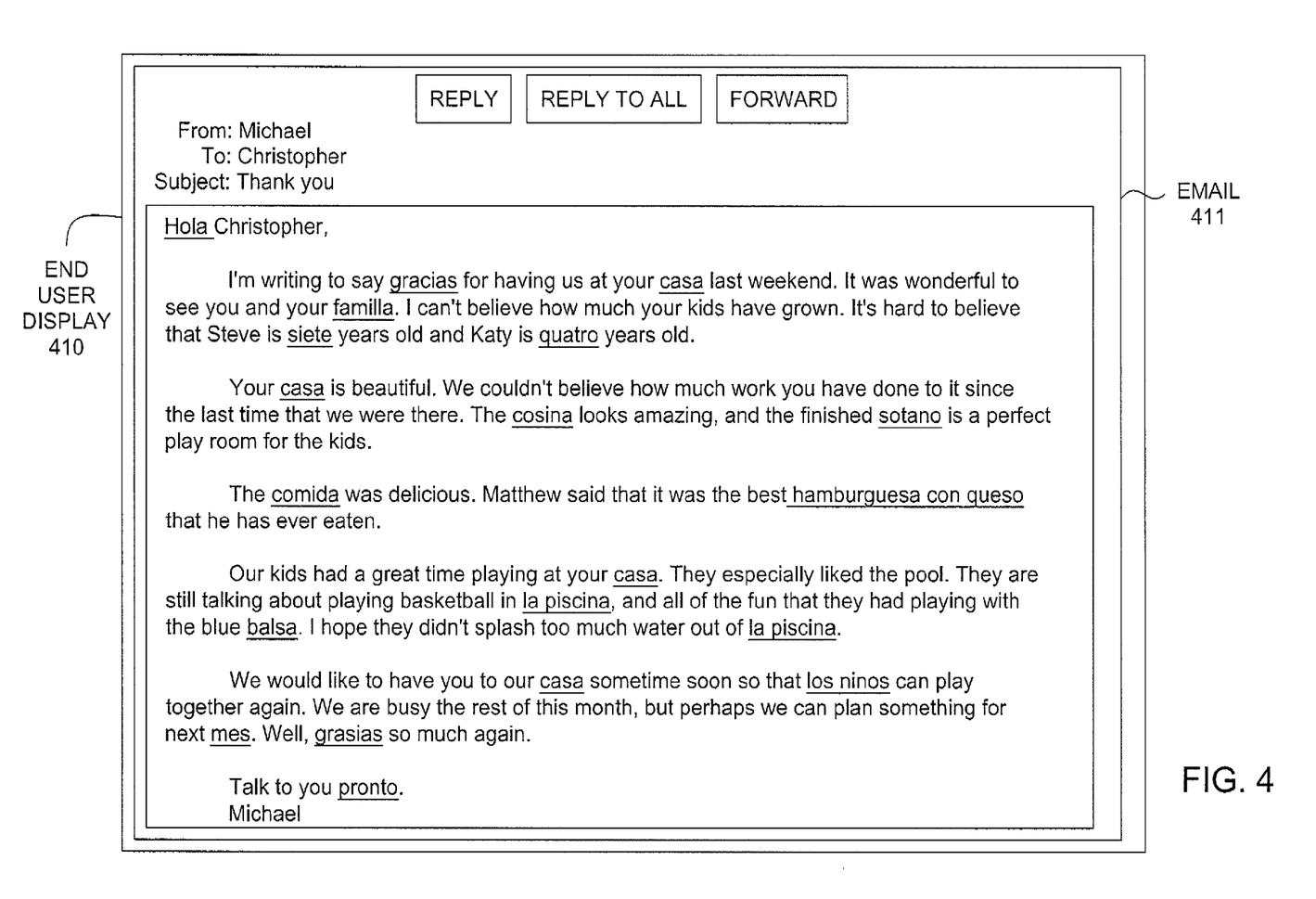
FIG. 4 depicts exemplary modified content formed in accordance with embodiments of the contextual language learning capability.

FIG. 4 depicts exemplary modified content formed in accordance with embodiments of the contextual language learning capability. More specifically, FIG. 4 depicts an exemplary presentation device illustrating an email which has been modified from English to a combination of English and Spanish in accordance with embodiments of the contextual language learning capability. As depicted in FIG. 4, an end user display 410 displays an email 411 that includes a combination of English words and Spanish words. The word replacement percentage in this example is approximately 10%, with about 20 of the 200 English words being replaced by their corresponding word/phrases in Spanish. For example, "hi" is replaced with "hola," "thank you" is replaced with "gracias," "house" is replaced with "casa," and so forth. As may be seen from the example, putting the Spanish words within the context of the English words provides sufficient context, such that it becomes relatively easy for the person reading the email to determine the English translation of the Spanish words/phrases and, thus, to learn those Spanish words by merely reading the email (a task he or she would have done anyway).

Although omitted for purposes of clarity, it will be appreciated that various types of control mechanisms may be made available within the context of presentation of modified content for further facilitating learning of the target language by the end user.

In one embodiment, for example, each portion of content translated into and presented in the target language may be highlighted for the end user, thereby enabling the end user to quickly identify the modified portions of the original content.

In one embodiment, for example, each portion of content translated into and presented in the target language may be selectable, for enabling the end user to request to review the original version of that portion of the content in the source language. For example, a portion of content may be selected by performing a mouse-over operation on that portion (e.g., which may result in presentation of the original source content or a menu enabling the end user to request to review the original source content). For example, a portion of content may be selected by performing a right-click operation on that portion to produce a menu that is configured to enable the end user to request to review the original source content. The various portions of content translated into and presented in the target language may be made selectable in any other suitable manner.

Additionally, although omitted for purposes of clarity, various other user control mechanisms related to the operation of contextual language learning capability may be supported. For example, controls enabling activation and deactivation of the contextual language learning capability may be provided. For example, controls enabling setting of conditions under which contextual language learning capability may be used (e.g., with all emails, only for audio content, for all audio and text content presented via the end user device, and the like) may be provided. For example, controls enabling the end user(s) to set various parameters of the contextual language learning capability (e.g., the content replacement parameters, the language-specific control information, and the like) may be provided. It is noted that any other suitable types of control mechanisms may be supported. It is further noted that such control mechanisms may be provided in any suitable manner.

Figure 5:
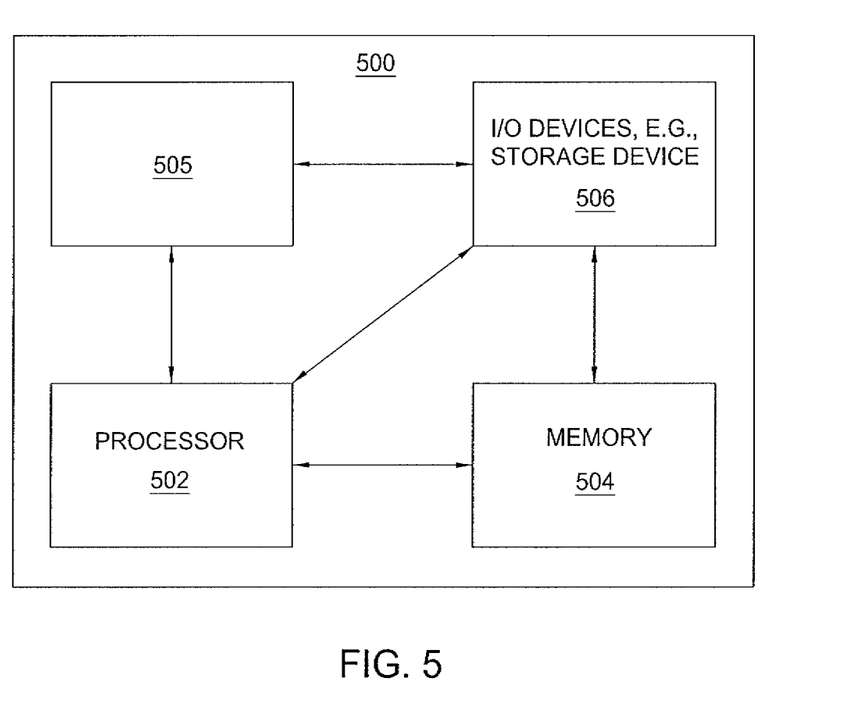
FIG. 5 depicts a high-level block diagram of a computer suitable for use in performing functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)) and a memory 504 (e.g., random access memory (RAM), read only memory (ROM), and the like). The computer 500 also may include a cooperating module/process 505 (e.g., which may correspond to content modification module 110 of FIG. 1) and/or various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or may be implemented in hardware (e.g., using a general purpose computer, one or more application specific integrated circuits (ASIC), and/or any other hardware equivalents).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 505 can be loaded into memory 504 and executed by the processor 502 to implement functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of portions of content modification module 110, content modification module 110, portions of user interface 210, user interface 210, portions of controller 220, controller 220, user interface 210 and controller 220, and the like, as well as combinations thereof.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
   a processor and a memory communicatively connected to the processor, the processor configured to:
      receive source content in a first language in association with a first activity of an end user, wherein the first activity of the end user has an activity type associated therewith, wherein the activity type associated with the first activity of the end user comprises at least one of reading text-based content, viewing content received from a communication network, or listening to audio content;
      automatically adjust content replacement control information, based on the activity type of the first activity of the end user, to provide adjusted content replacement control information;
      process the source content in the first language, based on the adjusted content replacement control information, to replace a subset of the source content in the first language with corresponding content in a second language and to provide thereby modified content comprising content in the first language and content in the second language, wherein the source content comprises a paragraph and the adjusted content replacement control information comprises a content replacement scope parameter indicative that one or more portions of the paragraph, other than a first sentence of the paragraph, are to be replaced with corresponding content in the second language; and
      provide the modified content in association with the first activity of the end user to support thereby a second activity of the end user, wherein the second activity of the end user comprises learning the second language.

2. The apparatus of claim 1, wherein reading text-based content comprises one of reading an email or reading an electronic book.

3. The apparatus of claim 1, wherein the processor is configured to control at least one characteristic of the subset of the source content in the first language that is replaced with corresponding content in the second language.

4. The apparatus of claim 3, wherein the at least one characteristic comprises at least one of a percentage of content replaced, a scope of content replaced, a type of content replaced, and a vocabulary difficulty of content replaced.

5. The apparatus of claim 1, wherein the content replacement control information comprises at least one of an indication of a proficiency of the end user with respect to the second language and an indication of an input entered by the end user.

6. The apparatus of claim 1, wherein the content replacement control information comprises at least one content replacement parameter.

7. The apparatus of claim 6, wherein the at least one content replacement parameter comprises at least one of a content replacement percentage indicative of a percentage of source content to be replaced, a content replacement scope parameter indicative of a scope of source content to be replaced, a content replacement type indicative of a type of source content to be replaced, and a vocabulary difficulty parameter indicative of a difficulty level of vocabulary of source content to be replaced.

8. The apparatus of claim 7, wherein the processor is further configured to adjust the adjusted content replacement control information based on at least one of an indication of a proficiency of the end user with respect to the second language or feedback of the end user.

9. The apparatus of claim 1, wherein the content replacement control information comprises a content replacement percentage, wherein the processor is further configured to:
increase the content replacement percentage in response to an indication that the end user is more proficient in the second language; and
decrease the content replacement percentage in response to an indication that the end user is less proficient in the second language.

10. The apparatus of claim 1, wherein the content replacement control information comprises a content replacement scope parameter configured to indicate whether the source content is to be replaced one or more of on a word-by-word basis, on a sentence-by-sentence basis, and on a paragraph-by-paragraph basis.

11. The apparatus of claim 1, wherein the content replacement control information comprises a vocabulary difficulty parameter indicative of a difficulty level of vocabulary of source content to be replaced, wherein the processor is further configured to:
increase the difficulty level of the vocabulary of the source content to be replaced in response to an indication that the end user is more proficient in the second language; and
decrease the difficulty level of the vocabulary of the source content to be replaced in response to an indication that the end user is less proficient in the second language.

12. The apparatus of claim 1, wherein content replacement control information comprises language-specific control information associated with at least one of the first language and the second language.

13. The apparatus of claim 1, wherein the processor is configured to process the source content in the first language to replace a subset of the source content in the first language with corresponding content in a second language by:
selecting the subset of the source content in the first language based on adjusted content replacement control information; and
translating the subset of the source content in the first language into corresponding content in the second language.

14. The apparatus of claim 1, wherein the first language is a native language of the end user, wherein the second language is a language to be learned by the end user.

15. The apparatus of claim 1, wherein the processor and memory form part of an end user device or a network device.

16. The apparatus of claim 1, wherein, to provide the modified content in association with the first activity of the end user to support thereby the second activity of the end user, the processor is configured to:
propagate the modified content toward a content presentation device.

17. The apparatus of claim 1, wherein, to provide the modified content in association with the first activity of the end user to support thereby the second activity of the end user, the processor is configured to:
operate a content presentation program configured to control presentation of the modified content.

18. The apparatus of claim 17, wherein the content presentation program comprises one of a text presentation program, an audio presentation program, a text-to-audio presentation program, or an audio-to-text presentation program.

19. The apparatus of claim 1, wherein the processor is configured to provide a language learning Application Programming Interface (API).

20. A non-transitory computer-readable storage medium storing instructions which, when executed by a computer, cause the computer to perform a method, the method comprising:
receiving source content in a first language in association with a first activity of an end user, wherein the first activity of the end user has an activity type associated therewith, wherein the activity type associated with the first activity of the end user comprises at least one of reading text-based content, viewing content received from a communication network, or listening to audio content;
automatically adjusting content replacement control information, based on the activity type of the first activity of the end user, to provide adjusted content replacement control information;
processing the source content in the first language, based on the adjusted content replacement control information, to replace a subset of the source content in the first language with corresponding content in a second language and to provide thereby modified content comprising content in the first language and content in the second language, wherein the source content comprises a paragraph and the adjusted content replacement control information comprises a content replacement scope parameter indicative that one or more portions of the paragraph, other than a first sentence of the paragraph, are to be replaced with corresponding content in the second language; and
providing the modified content in association with the first activity of the end user to support thereby a second activity of the end user, wherein the second activity of the end user comprises learning the second language.

21. A method, comprising:
receiving, via a processor, source content in a first language in association with a first activity of an end user, wherein the first activity of the end user has an activity type associated therewith, wherein the activity type associated with the first activity of the end user comprises at least one of reading text-based content, viewing content received from a communication network, or listening to audio content;

automatically adjusting content replacement control information, based on the activity type of the first activity of the end user, to provide adjusted content replacement control information;

processing the source content in the first language, based on the adjusted content replacement control information, to replace a subset of the source content in the first language with corresponding content in a second language and to provide thereby modified content comprising content in the first language and content in the second language, wherein the source content comprises a paragraph and the adjusted content replacement control information comprises a content replacement scope parameter indicative that one or more portions of the paragraph, other than a first sentence of the paragraph, are to be replaced with corresponding content in the second language; and providing the modified content in association with the first activity of the end user to support thereby a second activity of the end user, wherein the second activity of the end user comprises learning the second language.

* * * * *